June 7, 1932.  H. B. SHEPPARD  1,862,164
MEANS FOR PUMPING LUBRICANTS
Filed Nov. 6, 1929  3 Sheets-Sheet 1

Inventor
HENRY BERNARD SHEPPARD,
By
Toulmin & Toulmin
Attorneys

June 7, 1932.  H. B. SHEPPARD  1,862,164
MEANS FOR PUMPING LUBRICANTS
Filed Nov. 6, 1929   3 Sheets-Sheet 2

HENRY BERNARD SHEPPARD, Inventor

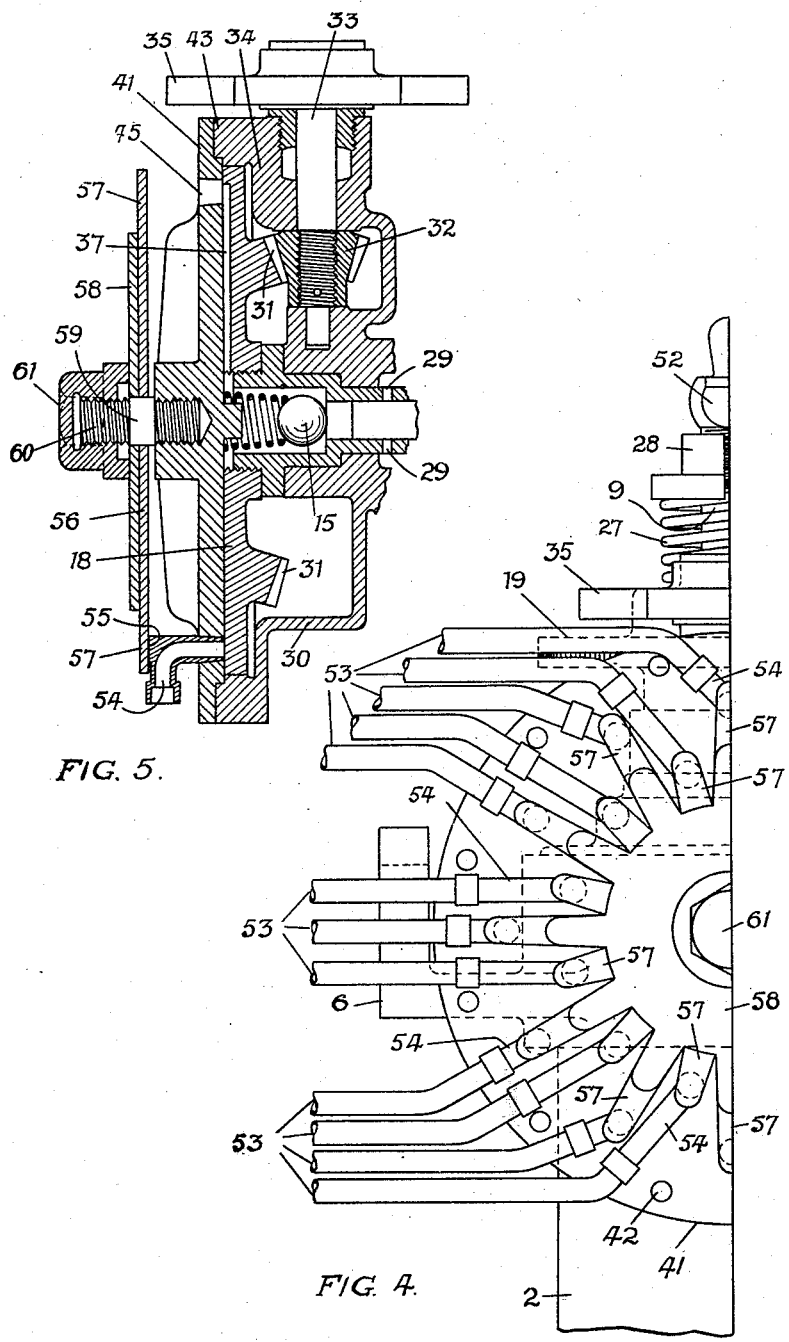

Patented June 7, 1932

1,862,164

UNITED STATES PATENT OFFICE

HENRY BERNARD SHEPPARD, OF DERBY, ENGLAND

MEANS FOR PUMPING LUBRICANTS

Application filed November 6, 1929, Serial No. 405,072, and in Great Britain November 16, 1928.

This invention relates to apparatus for mechanically supplying or delivering lubricant of the kind comprising a container for the lubricant, a lubricant compressing piston in said container, lubricant distributing means, a pump located between said distributing means and the lubricant container, means for operating the pump so as to pass lubricant from the container to the distributing means and means for operating the distributing means.

The present invention is directed more particularly to the means, in the above indicated kind of apparatus, for distributing and delivering the lubricant and has for its object to provide improvements thereto which will permit of a much simpler and more compact construction of apparatus.

Apparatus for mechanically supplying or delivering lubricant made according to this invention is characterized by the provision of a lubricant receiving member operable in abutment with the plane face of a stationary lubricant delivery member and adapted to distribute lubricant to ports in the delivery member for delivery to a plurality of sources, means being provided for operating said receiving and distributing member.

The lubricant distributing member may be an annulus or a solid disc with lubricant conveying passages arranged in its structure and adapted on rotation to communicate with delivery outlets in the adjacent lubricant delivery member.

The lubricant delivery member may be arranged adjacent one face of the distributing member or concentrically around its periphery or both adjacent one face and around its periphery so that lubricant issues through the face or periphery or both face and periphery of the distributing member to the delivery member for discharge therefrom at any convenient points.

The disc-like or annular lubricant distributing member may be provided with teeth for the engagement of a driving pinion for effecting its rotation.

Referring to the drawings filed herewith:—

Fig. 4 is a half end elevation of a further modified form;

Fig. 5 is a part sectional elevation thereof.

Figure 1:
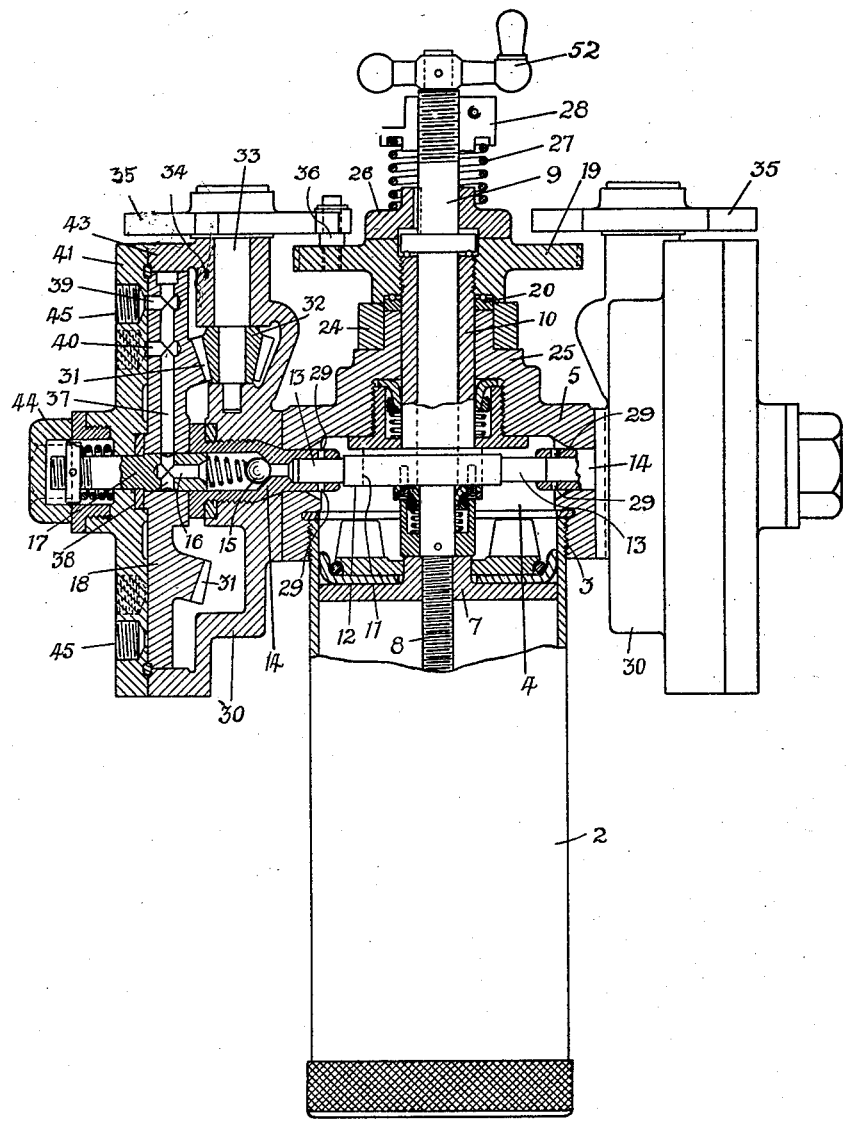
Fig. 1 is a part sectional elevation of one form of device made in accordance with this invention.

2 is a container for lubricant which may be detachably secured by screw thread 3 in the mouth of a chamber 4 formed in a bracket 5 of a base 6. In the container 2 is a traversing piston 7 adapted to be operated by a screw threaded rotatable piston rod 8 which is connected to, or integrally combined with a driving spindle 9 mounted in the bracket 5. On the driving spindle 9 is a rotatable sleeve 10 carrying at its inner end an eccentric or cam 11 located in the chamber 4 and encircling this cam is a strap 12 which is adapted to be reciprocated transversely of the chamber 4 by rotation of the cam, said strap having a lateral stem 13 at each side constituting plungers at the inlet ends of two small force pumps 14 housed in the bracket 5 diametrically opposite to one another. The pumps 14 are each provided with a non-return valve 15 at the outlet end which communicates with an inlet 16 arranged in the renewable centre piece 17 of a rotary disc-like lubricant receiving and distributing member 18. At the outer end of the rotatable sleeve 10 and rotatable therewith is a ratchet wheel 19 and interposed between this ratchet wheel and the bracket 5 is a ball thrust washer 20. Engaging the ratchet wheel 19 is a pawl 21 operated by a lever 22 carried by an extension 23 of a collar 24 rotatably mounted over a neck 25 of the bracket 5. Keyed to the spindle 9 is a friction plate 26 held in abutment with the outer face of the ratchet wheel 19 by a coil spring 27, the tension on the spring being effected by a locking ring 28.

The inlet end of each force pump 14 is provided with inlets 29 for the passage of lubricant from the chamber 4, the latter being in open communication with the adjacent open end of the lubricant container 2.

The rotary distributing members 18 are each rotatably mounted in a housing 30 of the bracket 5, being provided with a ring of teeth 31 for the engagement of a bevel pinion 32 which is mounted on a spindle 33 in a bearing 34 of the housing 30, the bevel pinion 32 being driven by a star wheel 35 positioned so as to be engaged and rotated by a lateral pin 36 projecting from the face of the ratchet wheel 19.

In each rotary distributing member 18 is a radial lubricant conveying passage 37 having open communication with a port 38 and the inlet 16 in the centre piece 17. This passage 37 has two lateral ports 39 and 40. Mounted adjacent the outer face of the rotary distributing member 18 is a stationary disc 41 which is secured by set screws at the holes 42 to the flange 43 of the housing 30 and held in tight abutment with the rotary disc-like distributing member 18 by the spring 44. In the stationary disc 41 are two series of circumferentially arranged lubricant delivery orifices 45 with which the ports 39 and 40 in the rotary lubricant distributing member 18 are adapted to register.

In operation, the lever 22 is operated by any suitable means in order to actuate the ratchet wheel 19. This causes the sleeve 10 and cam 11 to rotate, and the cam operating on the strap 12 effects reciprocation thereof. Assuming that no pressure of lubricant obtains in the container 2, the friction between the ratchet and the adjacent friction plate 26 is sufficient to rotate said friction plate which in turn rotates the spindle 9. Rotation of the spindle draws the piston forward against the lubricant in the container 2 until sufficient pressure is exerted on the lubricant to cause the friction plate 26 to slip. As the strap 12 reciprocates, the lubricant now under pressure enters the pump 14 through the inlets 29 when uncovered by the plungers 13 and on forward movement of the plungers lubricant is forced past the non-return valves 15, through the inlets 16 and ports 38 and into the passage 37 and lateral ports 39 and 40 of the rotary distributing member 18 to the inner face of the stationary lubricant delivery disc 41. The distributing member 18 is rotated through the medium of the star wheel 35 and pinion 32, and the ports 39 and 40 register in sequence with the delivery ports 45 whereby lubricant is delivered therethrough under pressure of the pumps 14. When the pressure on the lubricant in the container 2 falls due to the discharge of lubricant therefrom, the friction plate 26 again operates until a pressure is again set up and the above operation is repeated.

The action, therefore, is such that the whole force of the pumps operates on each delivery outlet 45 individually.

Figures 2, 3:
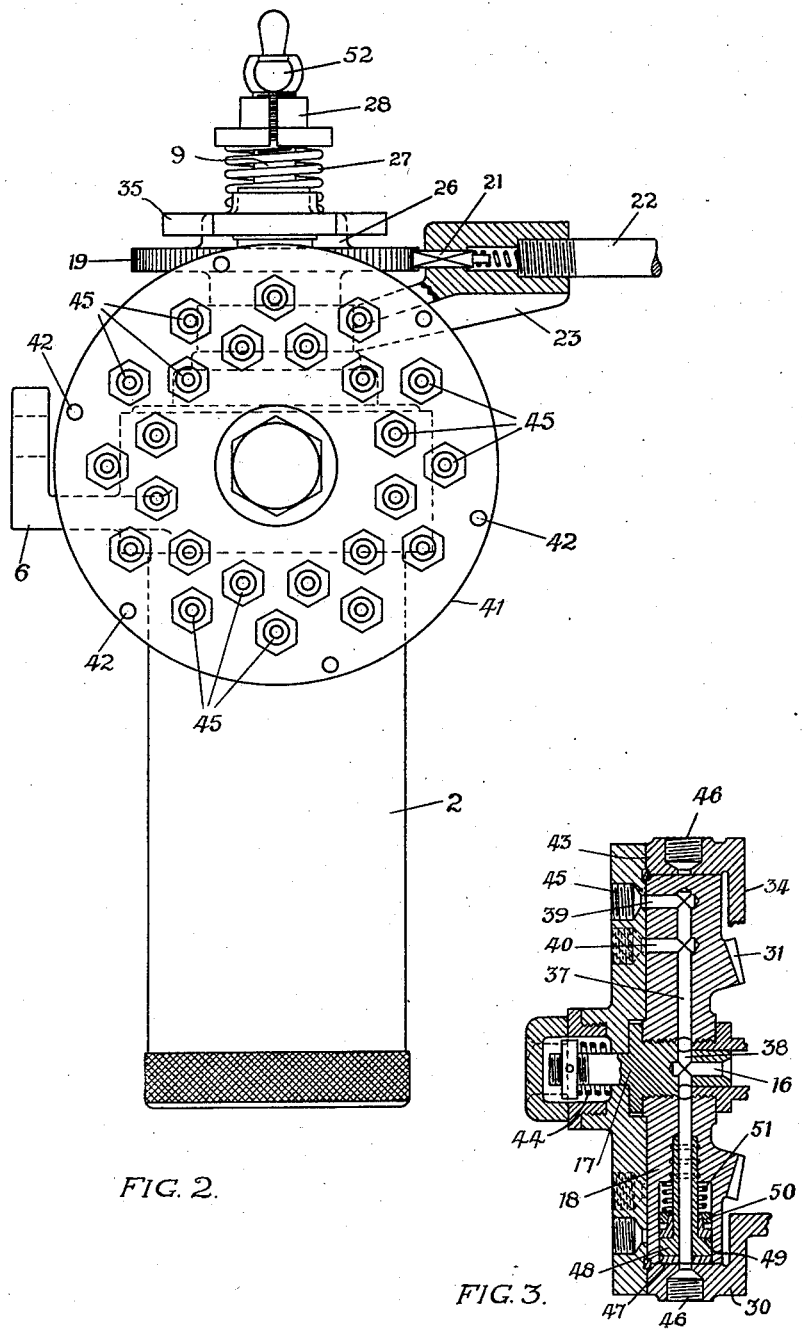
Fig. 2 is an end elevation of same.
Fig. 3 is a detail sectional view showing a modification.

Alternatively delivery ports 46 may be arranged peripherally in the flange 43 of the housing 30 in lieu of, or in addition to the ports 45 and adapted to communicate with the passage 37 of the distributing member 18 as shown in Fig. 3, and where desired a suitable packing ring 47 may be interposed between the periphery of the distributing member 18 and the flange 43 and held in position by abutment member 48, 49 and 50 and a spring 51.

In the construction illustrated the piston 7 is shown in the position when a charge of lubricant is required and for retracting the piston to the outer end of the container, a hand lever 52 is provided at the extreme end of the spindle 9.

The load on the spring 27 can be altered to the pressure required to be maintained on the lubricant.

Although the star wheel 35 is illustrated as the driving medium for the spindle 33 and the star wheel is operated by the pin 36, it is to be understood that a suitable arrangement of gears or pinions may be provided for driving the spindle 33.

Figs. 4 and 5 illustrate a modification whereby provision is made for a plurality of delivery pipes 53 to be readily and quickly coupled up to the delivery member 41 and this is effected by means of a plurality of bends or elbows 54 each having a push-in or other tight fit capable of quick fitment to the delivery orifices 45 of the delivery member 41. These elbows 54 are each provided with an abutment face 55 as illustrated in Fig. 5 (one elbow only being shown for example) adapted to be engaged by a resilient retaining spider 56, each arm 57 of which contacts with the abutment face 55 of an adjacent elbow 54. Where two circumferential rings or delivery orifices 45 are provided in the delivery member 41 as shown, the inner ring of elbows 54 are of sufficient length from the bend to their outer ends so that the outer or coupling ends approximately occur on the same circumferential line, consequently the adjacent arms 57 of the spider 56 are long and short. In order to strengthen the longer arms and prevent the tendency of elbows retained thereby from becoming loose an additional spider 58 is provided. Both spiders 57 and 58 are loosely mounted on the smooth portion 59 of a screw threaded stud 60 which is threaded into the delivery member 41 and by means of a cap 61 engaging the outer end of this stud 60, the pressure of the spiders 57 and 58 on the elbows 54 can be adjusted.

In this modification, the rotary distributing member 18 is provided with its lubricant conveying passage 37 in the form of a radial groove in its face adjacent the delivery member 41 whereby the lubricant issues directly from the passage 37 into the delivery orifices 45, thus eliminating the necessity for providing the ports 39 and 40 illustrated in Figs. 1 and 3.

In use, for coupling up the pipes 53 to the delivery member 41, the elbows 54 are inserted into position and the spiders 57 and 58 are pressed against them by the cap 61.

What I claim and desire to secure by Letters Patent is:—

1. Apparatus for mechanically supplying or delivering lubricant comprising a member formed with an open mouthed chamber having a non-return valve, an open ended container for storing lubricant detachably secured to the mouth of said chamber, a lubricant compressing piston in said container for traversing lubricant therein bodily under pressure to the chamber, a pump located in said chamber and operable in a compressed mass of lubricant therein for ejecting lubricant in a radial direction from the chamber past said non-return valve, said non-return valve being arranged co-axial with the pump, a housing secured to the member and accommodating the non-return valve, a stationary lubricant delivery member secured exteriorly to said housing, a rotatable lubricant receiving and distributing disc mounted interiorly of the housing and adapted to feed lubricant in a forward direction continuous with the direction of entry of said lubricant to said distributing disc and to convey it selectively to outlets in the lubricant delivery member for discharge therefrom still in a forward direction, means for operating the pump, frictional means associated with said pump operating means for operating the lubricant compressing piston in relation to a load on said frictional means, and means associated with the pump operating means for operating the lubricant receiving and distributing disc.

2. Apparatus for mechanically supplying or delivering lubricant comprising a member formed with an open mouthed chamber having a non-return valve, an open ended container for storing lubricant detachably secured to the mouth of said chamber, a lubricant compressing piston in said container for traversing lubricant therein bodily under pressure to the chamber, a pump located in said chamber and operable in a compressed mass of lubricant therein for ejecting lubricant in a radial direction from the chamber past said non-return valve, said non-return valve being arranged co-axial with the pump, a housing secured to the member and accommodating the non-return valve, a stationary lubricant delivery member secured exteriorly to said housing, a rotatable lubricant receiving and distributing disc having a driving pinion thereon mounted interiorly of the housing and adapted to feed lubricant in a forward direction continuous with the direction of entry of said lubricant to said distributing disc and to convey it selectively to outlets in the lubricant delivery member for discharge therefrom still in a forward direction, means for operating the pump, frictional means associated, and automatically operable, with said pump operating means for operating the lubricant compressing piston in relation to a load on said frictional means, and means associated with the pump operating means for operating the lubricant receiving and distributing disc, said means comprising a spindle rotatably mounted in the housing, a member fast on said spindle and located exteriorly of the housing for rotation by the pump operating means, a pinion on the spindle and rotatable therewith, located interiorly of the housing and engaging the driving pinion on the lubricant receiving and distributing disc.

In testimony whereof, I affix my signature.

HENRY B. SHEPPARD.